(12) United States Patent
Marple et al.

(10) Patent No.: US 9,733,123 B2
(45) Date of Patent: Aug. 15, 2017

(54) MULTI-FIBER OPTICAL CONNECTOR ASSEMBLY THAT INCLUDES AN OPTICAL CONNECTOR AND A CONNECTOR HOUSING

(71) Applicant: Captain JRT LLC, Loxahatchee, FL (US)

(72) Inventors: Eric Todd Marple, Loxahatchee, FL (US); Kirk David Urmey, West Milton, OH (US)

(73) Assignee: Captain JRT LLC, Loxahatchee, FL (US)

( * ) Notice: Subject to any disclaimer, the term of this patent is extended or adjusted under 35 U.S.C. 154(b) by 0 days.

(21) Appl. No.: 15/382,419

(22) Filed: Dec. 16, 2016

(65) Prior Publication Data

US 2017/0176252 A1    Jun. 22, 2017

Related U.S. Application Data

(60) Provisional application No. 62/269,583, filed on Dec. 18, 2015.

(51) Int. Cl.
*G02B 6/36* (2006.01)
*G01J 3/02* (2006.01)
(Continued)

(52) U.S. Cl.
CPC ............ *G01J 3/0202* (2013.01); *G01J 3/024* (2013.01); *G01J 3/0218* (2013.01);
(Continued)

(58) Field of Classification Search
CPC ........ G01J 3/0202; G01J 3/0218; G01J 3/024; G01J 3/0229; G01J 6/3825; G01J 6/3821;
(Continued)

(56) References Cited

U.S. PATENT DOCUMENTS 5,042,893 A * 8/1991 Ong ...................... G01J 3/02
356/326
7,728,972 B2 * 6/2010 Yang ..................... G01J 3/02
356/326

(Continued)

*Primary Examiner* — Thomas A Hollweg
*Assistant Examiner* — Guy Anderson
(74) *Attorney, Agent, or Firm* — Ingram IP Law, P.A.

(57) ABSTRACT

A connector assembly is provided for coupling optical fibers to a spectrometer. The connector assembly includes a plate having a slit defined therein and a ferrule that secures end portions of the optical fibers therein. The ferrule includes a forward end having an aperture that receives the optical fibers. The connector assembly further includes a connector housing having an alignment mechanism with a plate recess dimensioned to receive the plate therein and a ferrule recess dimensioned to receive the forward end of the ferrule therein. The plate recess orients the plate and the ferrule recess orients the ferrule within the connector assembly that includes a spring for imparting a force urging the forward end of the ferrule into contact with the plate to minimize an air gap between the plate and the ferrule. The spring and the alignment mechanism maintain the ferrule in an x-y-z, rotation, and/or an angular orientation.

29 Claims, 6 Drawing Sheets

(51) Int. Cl.
*G02B 6/38* (2006.01)
*G02B 6/42* (2006.01)
(52) U.S. Cl.
CPC .......... *G01J 3/0229* (2013.01); *G02B 6/3821* (2013.01); *G02B 6/3825* (2013.01); *G02B 6/3874* (2013.01); *G02B 6/3887* (2013.01); *G02B 6/3893* (2013.01); *G02B 6/42* (2013.01)
(58) Field of Classification Search
CPC ...... G01J 6/3874; G01J 6/3887; G01J 6/3893; G01J 6/42
USPC ................................................ 385/88–94, 53
See application file for complete search history.

(56) References Cited

U.S. PATENT DOCUMENTS

| | | | |
|---|---|---|---|
| 8,534,928 B2* | 9/2013 | Cooke | G02B 6/3885 385/78 |
| 9,322,987 B2* | 4/2016 | Doany | G02B 6/02042 |
| 2009/0246962 A1* | 10/2009 | Tometsuka | C23C 16/4405 438/706 |
| 2015/0063755 A1* | 3/2015 | Doany | G02B 6/02042 385/59 |

* cited by examiner

MULTI-FIBER OPTICAL CONNECTOR ASSEMBLY THAT INCLUDES AN OPTICAL CONNECTOR AND A CONNECTOR HOUSING

CROSS-REFERENCE TO RELATED APPLICATIONS

This application claims priority to U.S. Provisional Application 62/269,583, filed on Dec. 18, 2015, the complete disclosure of which is incorporated herein by reference in its entirety.

FIELD OF THE TECHNOLOGY

The technology relates generally to a multi-fiber optical connector assembly that includes a connector for a fiber optic probe assembly and a connector housing and more particularly to a multi-fiber optical connector assembly that includes a connector for a fiber optic probe assembly and a connector housing secured to a spectrometer.

BACKGROUND OF THE TECHNOLOGY

Light-scattering spectroscopy entails illuminating a substance and analyzing light rays scattered from the substance. Conventionally, a fiber optic probe assembly is provided to illuminate the substance and to guide collected light rays into a spectrometer. The fiber optic probe assembly includes an optical fiber with a first or proximal end connected proximate to a laser source and a second or distal end that terminates at a probe tip. The optical fiber guides light rays emitted from a laser source to the probe that illuminates the substance being examined. The fiber optic probe assembly includes a different set of optical fibers having first or distal ends located at the probe and second or proximal ends coupled proximate to the spectrometer. The probe collects light rays scattered by the substance. The different set of optical fibers guides the light rays collected at the probe tip to a spectrometer for analysis.

Raman spectroscopy and other spectroscopies employing optical fibers have limitations that make the technology challenging for medical and other applications. For example, in Raman spectroscopy there is a balance between gathering sufficient light rays through the optical fibers to provide fast acquisition times and having sufficient spectral resolution to identify compounds in a sample or substance. Furthermore, the Raman effect provides very weak signals such that Raman emissions collected at the probe may be one millionth or even less as intense as the exciting radiation that illuminates the sample or sub stance.

Additionally, there are challenges introduced by the spectroscopy equipment itself. Typically, the fiber optic probe assembly includes a connector having a linear bundle of optical fibers that must be aligned with an entrance slit at the spectrometer. A technician aligns the linear bundle by rotating a round connector while monitoring light levels in the spectrometer. Once optimized, the technician tightens down a threaded portion of the round connector to lock the linear bundle in place. During medical procedures, the fiber optic probe assembly may be unplugged from the spectrometer for sterilization or resterilization and replaced after each procedure. The linear bundle in the connector must be aligned with the entrance slit at the spectrometer in a same way each time to allow repeatability of results. A small rotational misalignment of the linear bundle may introduce significant positional misalignment and positional variations on every reconnection. This may result in a reduced signal strength and low performance for the chemometric model. Other drawbacks exist.

BRIEF DESCRIPTION OF THE DRAWINGS

Implementations of the present technology will now be described, by way of example only, with reference to the attached figures, wherein.

DETAILED DESCRIPTION OF THE TECHNOLOGY

What is needed is a multi-fiber optical connector assembly that includes a connector for a fiber optic probe assembly and a connector housing. The multi-fiber optical connector assembly may utilize a connector that easily plugs into and unplugs from the connector housing while enabling repeatable fiber positioning into the spectrometer. According to one example, the multi-fiber optical connector assembly guides light rays from the fiber optic probe assembly into the spectrometer in a consistent repeatable fashion. The technology provides a direct input from the connector into the spectrometer for maximum light input. According to one example, the multi-fiber optical connector assembly may include no optical elements between the connector and the connector housing or the plate having the slit. This direct input results in short acquisition times and high signal-to-noise ratios for the spectrometer. According to one example, the fiber optic probe assembly and the connector housing may be used in Raman spectroscopy.

It will be appreciated that for simplicity and clarity of illustration, where appropriate, reference numerals may be repeated among the different figures to indicate corresponding or analogous elements. In addition, numerous specific details are set forth in order to provide a thorough understanding of the examples described herein. However, it will be understood by those of ordinary skill in the art that the examples described herein can be practiced without these specific details. In other instances, methods, procedures and components have not been described in detail so as not to obscure the related relevant feature being described. Also, the description is not to be considered as limiting the scope of the examples described herein. The drawings are not necessarily to scale and the proportions of certain parts have been exaggerated to better illustrate details and features of the present disclosure. Those skilled in the art with access to the teachings provided herein will recognize additional modifications, applications, and examples within the scope thereof and additional fields in which the technology would be of significant utility.

Unless defined otherwise, technical and scientific terms used herein have the same meaning as is commonly understood by one of ordinary skill in the art to which this disclosure belongs. The term optical element or collection element as used herein include optical fibers along with assemblies that include various combinations of optical fibers, filters, and lenses. The terms "first," "second," and the like, as used herein do not denote any order, quantity, or importance, but rather are used to distinguish one element from another. Also, the terms "a" and "an" do not denote a limitation of quantity, but rather denote the presence of at least one of the referenced items. The term "or" is meant to be inclusive and means either, any, several, or all of the listed items.

The terms "connected" and "coupled" are not restricted to physical or mechanical connections or couplings, and can include electrical connections or couplings, whether direct or indirect. The connection can be such that the objects are permanently connected or releasably connected. Furthermore, two components may be coupled to each other even though they are not in direct contact with each other. The term "communicatively coupled" is defined as connected, either directly or indirectly through intervening components, and the connections are not necessarily limited to physical connections, but are connections that accommodate the transfer of data, light, signals, or other matter between the so-described components. The term "substantially" is defined to be essentially conforming to the thing that it "substantially" modifies, such that the thing need not be exact. For example, substantially real-time means that the occurrence may happen without noticeable delay, but may include a slight delay.

Figure 1:
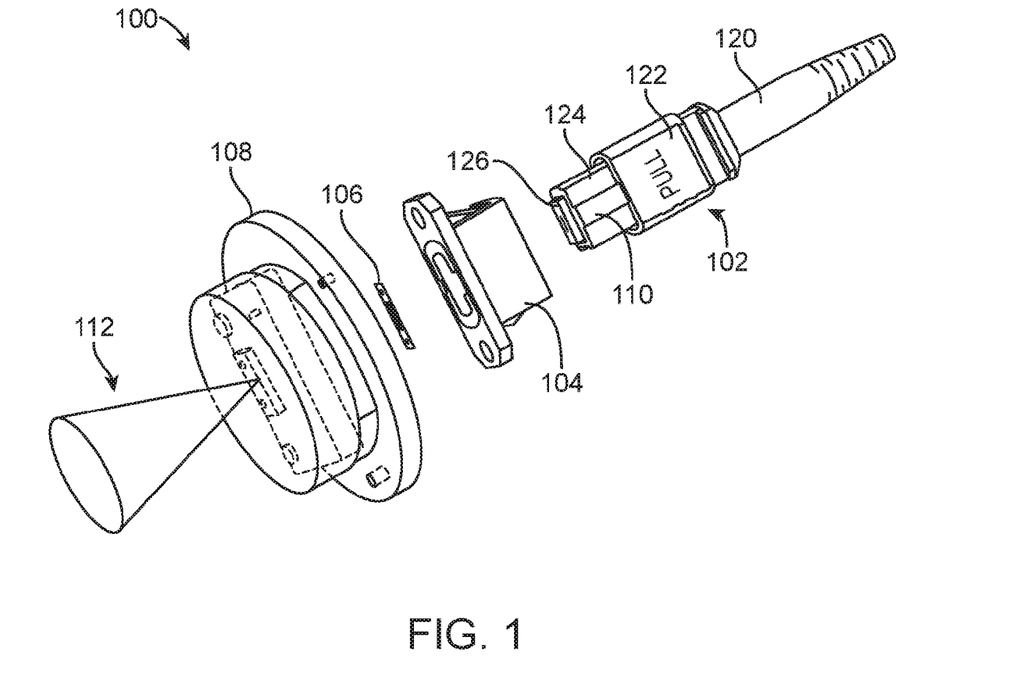
FIG. 1 illustrates a magnified view of a portion of FIG. 5 and includes a perspective view of a multi-fiber optical connector assembly according to one example of the technology.
Figure 5:
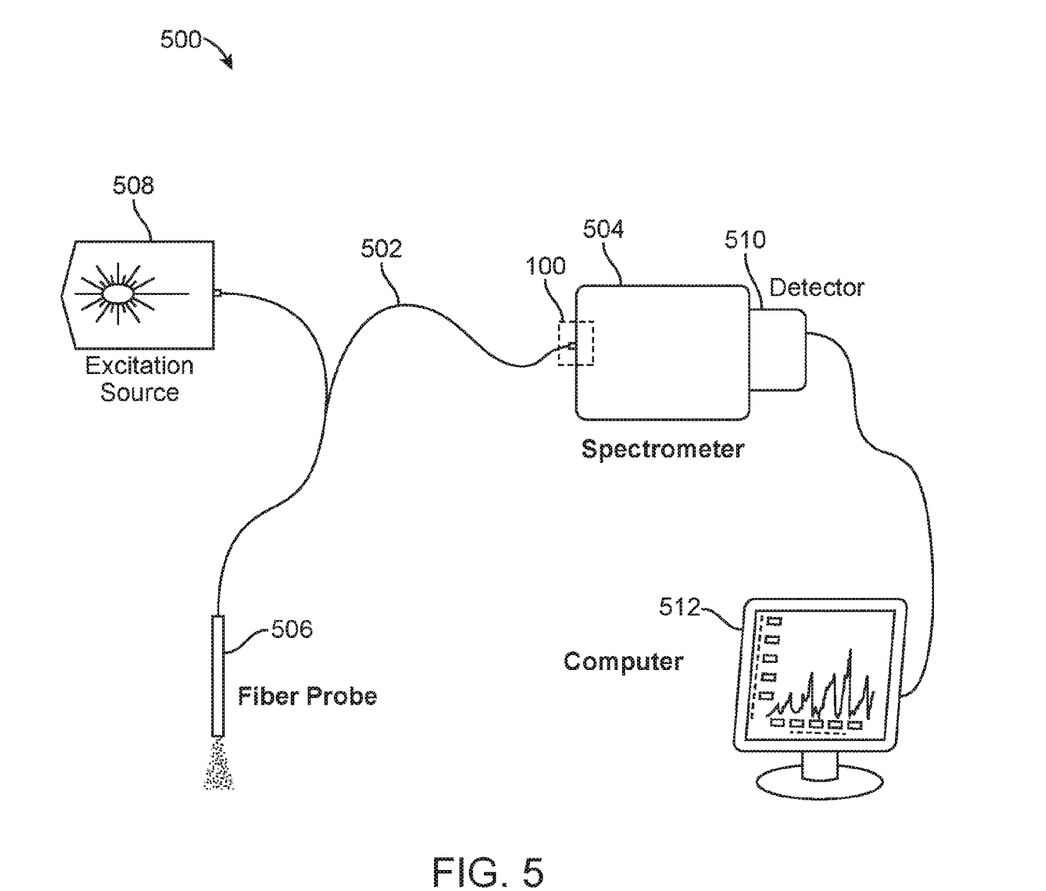
FIG. 5 illustrates a system that includes the multi-fiber optical connector assembly according to one example of the technology.
Figure 7:
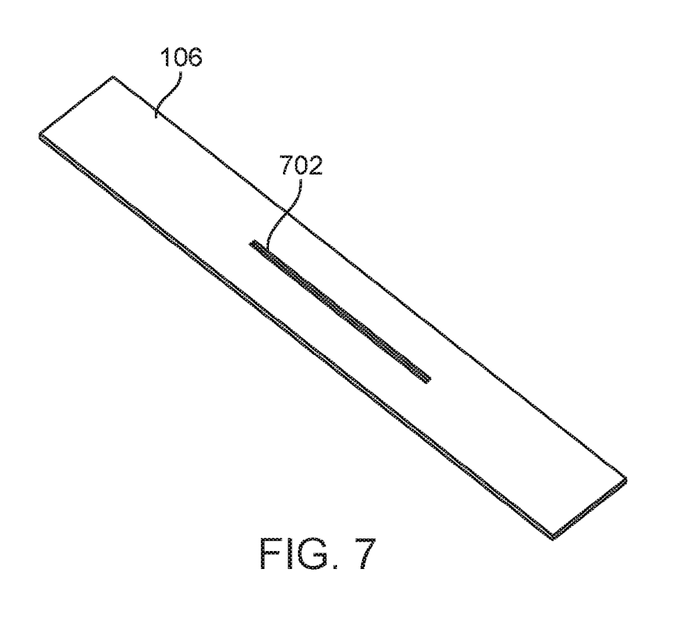
FIG. 7 illustrates a perspective view of a plate having a slit defined therein according to one example of the technology.

A multi-fiber optical connector assembly is needed for coupling a connector for the fiber optic probe assembly and a multi-fiber optical connector housing (hereinafter "connector housing"). According to one example, the connector housing may be affixed to a spectrometer. According to one example, the improved multi-fiber optical connector assembly is configured to guide the input of light rays more uniformly and repeatably from the fiber optic probe assembly into the spectrometer. FIG. 1 illustrates one example of an exploded view of a multi-fiber optical connector assembly 100 that includes a connector 102 for the fiber optic probe assembly, a bulkhead adapter 104, a plate 106 with a slit 702, and a connector housing 108. The connector 102 may include a cable boot 120, a pull release 122, a outer housing 124, and a ferrule 126. With reference to FIG. 5, the multi-fiber optical connector assembly 100 couples the fiber optic probe assembly 502 to a spectrometer 504. According to one example, the fiber optic probe assembly 502 also is coupled to an excitation source 508 such as a laser source. According to one example, the fiber optic probe assembly 502 includes the probe distal tip 506 that illuminates a substance and guides collected light rays into the spectrometer 504. The technology also may include a detector 510 and a computer 512 that displays images.

According to one example, the multi-fiber optical connector assembly 100 may include an orientation mechanism that ensures the connector 102 is inserted into the bulkhead adapter 104 in a single orientation. For example, an outer surface of the outer housing 124 may include a protrusion or key 110 that is received in a corresponding slot formed at an inside surface of the bulkhead adapter 104. The key 110 and corresponding slot ensure that the connector 102 is inserted into the bulkhead adapter 104 a same way each time. One of ordinary skill in the art will readily appreciate that other orientation mechanisms may be used to ensure that the connector 102 is inserted into the bulkhead adapter 104 a same way each time.

According to one example, the bulkhead adapter 104 may be mechanically coupled to the connector housing 108. For example, the bulkhead adapter 104 may be mechanically coupled to the connector housing 108 using screws, fasteners, or the like. Alternatively, components of the bulkhead adapter 104 may be formed integrally with the connector housing 108. In this case, the bulkhead adapter 104 is not removable. According to one example, the bulkhead adapter 104 is oriented within the connector housing 108 to properly align optical fibers in the connector 102 with entrance optics of the spectrometer 504 when the connector 102 is inserted into the connector housing 108. Accordingly, the multi-fiber optical connector assembly 100 provides a quick connect and self-aligning optical connector assembly technology that does not require manual alignment by a technician or operator. For example, the quick connect feature includes a snap-on/snap-off connector. The multi-fiber optical connector assembly 100 further provides repeatable results due to the self-aligning optical connector assembly technology that does not require manual alignment by a technician. In contrast, conventional optical connector assembly technology like an SMA connector with multiple fibers requires a technician to align optical fibers in a connector with entrance optics of the spectrometer 504 by rotating the connector while monitoring light levels in the spectrometer 504. Once optimized, conventional optical connector assembly technology requires the technician to tighten down a threaded portion of the connector to lock the connector in place. Conventional optical connector assembly technology can suffer from reduced signal strength, lowered performance, and non-repeatable results, among other deficiencies, due to misalignment between the optical components.

According to one example, the connector housing 108 includes an aperture that is positioned to align with both the entrance optics of the spectrometer 504 and the optical fibers in the connector 102. As described further below, the plate 106 may be placed within the aperture of the connector housing 108 to provide greater spectral resolution by the spectrometer 504. According to one example, the multi-fiber optical connector assembly 100 efficiently delivers the light rays that travel through the optical fibers in the connector 102 into the entrance optics of the spectrometer 504. FIG. 1 illustrates a light source 112 emitted from the aperture of the connector housing 108, which may be aligned with the entrance optics of the spectrometer 504. The self-aligning optical connector assembly technology described herein offers improved performance and reduced signal attenuation as compared to conventional optical connector assembly technology.

Figure 2:
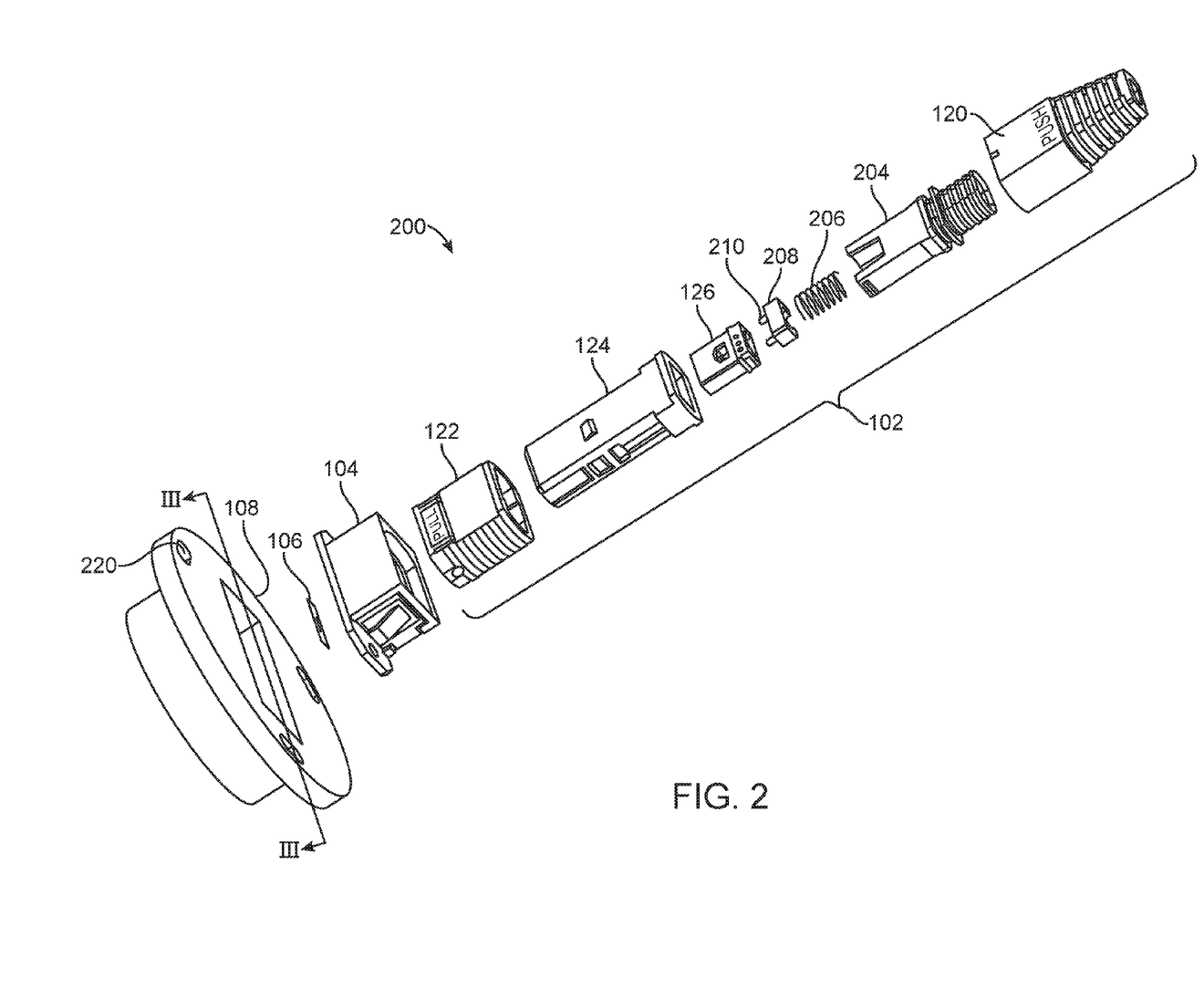
FIG. 2 illustrates a perspective view of the multi-fiber optical connector assembly with an exploded view of the connector according to one example of the technology.

FIG. 2 illustrates one example of a multi-fiber optical connector assembly 200 that includes the bulkhead adapter 104, the plate 106, the connector housing 108, and the connector 102 (shown in exploded view). According to one example, the connector 102 may include a cable boot 120, a spring push 204, a spring 206, a spring clip 208, a ferrule 126, an outer housing 124, and a pull release 122. While optical fibers are not illustrated in FIG. 2, the optical fibers may include a distal end that originates at the probe tip where the measurement occurs. A proximal end of the optical fibers may pass through the connector 102 components including the cable boot 120, the spring push 204, the spring 206, the spring clip 208, and may be secured to the ferrule 126. According to one example, end portions of the optical fibers may be affixed within the ferrule 126. For example with reference to FIG. 6, the proximal end portions of the optical fibers may be affixed within the ferrule 126 using epoxy, adhesive, or the like. According to one example, the epoxy or adhesive may be injected through the opening 601. According to one example, a forward end 602 of the ferrule 126 may include a slot 604 that is dimensioned to receive optical fiber ends therethrough. The slot 604 may be a continuous slot such as a rectangular shaped slot that is dimensioned to receive ends from a plurality of optical fibers 302. Alternatively, the slot 604 may include individual openings for each end of the plurality of optical fibers 302. According to one example, the plurality of optical fibers 302 may be positioned parallel relative to each other. Alternatively, the plurality of optical fibers 302 may be positioned in other arrangements relative to each other.

According to one example, after the proximal end portions of the optical fibers are secured within the ferrule 126, the spring clip 208 may be mechanically coupled to a rear end of the ferrule 126. For example, the spring clip 208 may include protrusions 210 that extend through corresponding bores provided in a lengthwise direction of the ferrule 126. The protrusions 210 may be inserted into the corresponding bores to mechanically couple the spring clip 208 and the ferrule 126. One of ordinary skill in the art will readily appreciate that other mechanisms may be provided to mechanically couple the spring clip 208 and the ferrule 126.

According to one example, the connector 102 may include a spring 206 that is provided rearward of the spring clip 208. The spring clip 208 may be configured to secure one end of the spring 206. The connector 102 may further include a spring push 204 that is provided rearward of the spring 206 and the spring clip 208. The spring push 204 may contact and compress a second end of the spring 206 toward the spring clip 208. The spring force exerted by the spring 206 onto the spring clip 208 pushes the rear end 608 of the ferrule 126. As illustrated in FIG. 1, the spring force causes the forward end of the ferrule 126 to protrude beyond a forward end of the outer housing 124. According to one example, the spring push 204 may be inserted into the outer housing 124 and may be secured in place by teeth or a locking mechanism provided at the spring push 204. According to one example, the spring push 204 and outer housing 124 may be disassembled and separated after assembly. For example, the spring push 204 and outer housing 124 may be disassembled and separated by inserting pins through holes provided in the outer housing 124 to release the teeth or the locking mechanism.

According to one example, the ferrule 126 and the outer housing 124 may be formed with substantially rectangular shapes in lateral cross-section. The rectangular shape limits the number of ways the connector 102 may be inserted into the bulkhead adapter 104. According to one example, an outer surface of the outer housing 124 and/or the ferrule 126 may include a protrusion or key that is received in a corresponding key slot formed at an inside surface of the bulkhead adapter 104 and/or the connector housing 108. The key and the corresponding key slot ensure that the connector 102 is inserted into the bulkhead adapter 104 and/or the connector housing 108 a same way each time. According to one example, the multi-fiber optical connector assembly technology provides at least two orientation mechanisms, which include the rectangular shape of the ferrule 126 and/or the outer housing 124 along with the protrusion or key provided on the ferrule 126 and/or the outer housing 124.

One of ordinary skill in the art will readily appreciate that the ferrule 126 and the outer housing 124 may include any shape in lateral cross-section.

While not illustrated, the connector housing 108 may be mechanically coupled to the spectrometer 504 through mounting holes 220. For example, the connector housing 108 may be mechanically coupled to the spectrometer 504 using screws, fasteners, or the like. One of ordinary skill in the art will readily appreciate that the connector housing 108 may be mechanically coupled to the spectrometer 504 through other mechanisms.

Figure 3:
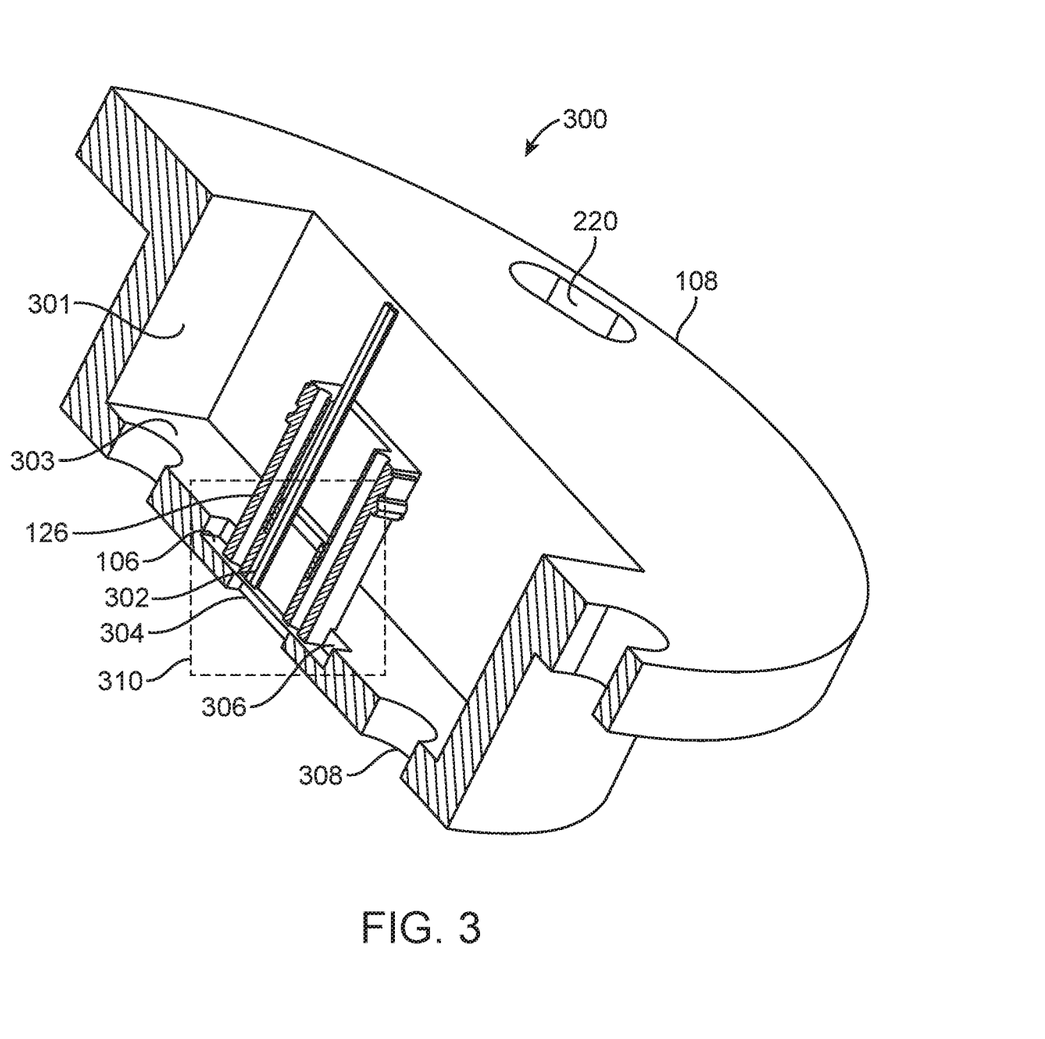
FIG. 3 illustrates a cross-sectional view of the multi-fiber optical connector assembly taken along line of FIG. 2 according to one example of the technology.

FIG. 3 illustrates a cross-sectional view taken along line of FIG. 2 according to one example of the technology. The plate 106, the ferrule 126, and a plurality of optical fibers 302 are shown in an engaged relationship with the connector housing 108. In other words, these components are shown in positions corresponding to when the connector 102 is plugged into the connector housing 108 of the multi-fiber optical connector assembly 300. In order to simplify an understanding of the technology, certain components are omitted from FIG. 3 including the bulkhead adapter 104, the cable boot 120, the spring push 204, the spring 206, the spring clip 208, the outer housing 124, and the pull release 122.

According to one example, the connector housing 108 includes a recessed portion 301 that receives the connector 102 therein. The recessed portion 301 includes a bottom wall 303 having an aperture 304 provided therein. According to one example, the connector housing 108 may be mechanically coupled to the spectrometer 504 and may be oriented so that the aperture 304 aligns with the entrance optics of the spectrometer 504. According to one example, the aperture 304 may be rectangular shaped to generally coincide with a shape and size of a slot 604 provided at the forward end 602 of the ferrule 126. The slot 604 may be configured to receive the ends of the optical fibers 302 therethrough. According to one example, the ends of the optical fibers 302 may be polished flush with the forward end 602 of the ferrule 126. One of ordinary skill in the art will readily appreciate that the aperture 304 may be any shape and size to pass light rays emitted from the optical fibers 302. According to one example, the bottom wall 303 of the recessed portion 301 also may include holes 308 for mechanically coupling the bulkhead adapter 104 therein. One of ordinary skill in the art will readily appreciate that the holes 308 may be omitted if the features of the bulkhead adapter 104 are formed integral with the connector housing 108.

Figure 4:
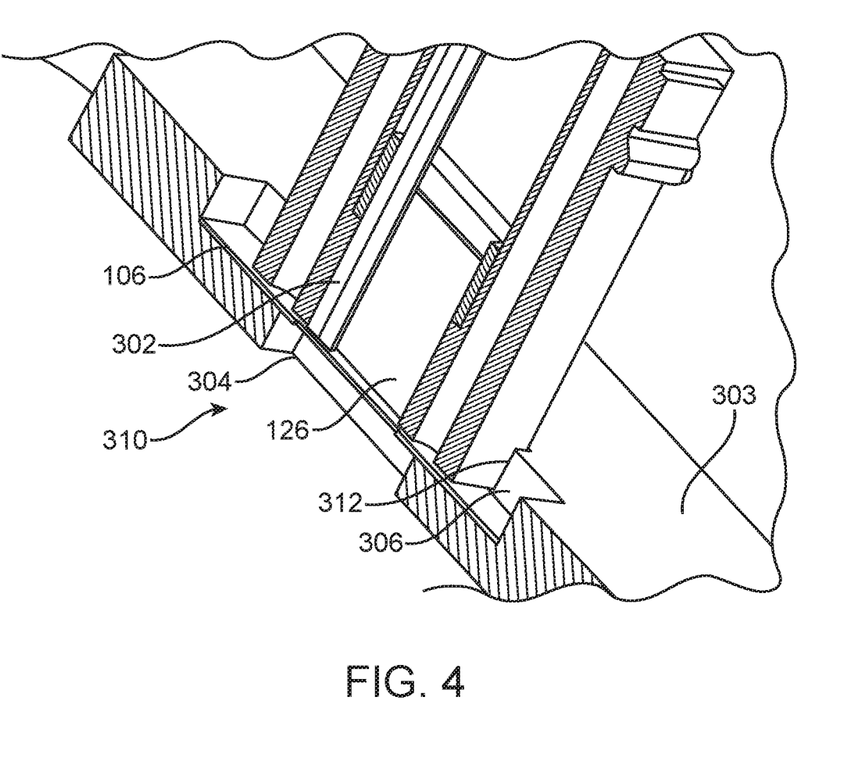
FIG. 4 illustrates a magnified view of a portion of FIG. 3 according to one example of the technology.

FIG. 4 illustrates a magnified view of the features illustrated in box 310 of FIG. 3. As discussed above, the aperture 304 may be provided in the bottom wall 303 of the recessed portion 301 to pass light rays emitted from the optical fibers 302. According to one example, a plate recess 306 may be formed in the bottom wall 303 to receive the plate 106 therein. According to one example, the plate 106 may be secured within the plate recess 306 by an adhesive, a mechanical fastener, or the like. The plate recess 306 may be formed proximate to the aperture 304 and may be formed to a depth that is approximately half the depth of the bottom wall 303. According to one example, the slit 702 in the plate 106 may be dimensioned narrower than a fiber core diameter to provide greater spectral resolution by the spectrometer 504. According to one example, a ferrule recess 312 may be formed in the bottom wall 303 to receive the forward end 602 of the ferrule 126 therein. According to one example, the ferrule 126 may be secured within the ferrule recess 312 by a friction fit between an external surface of the ferrule 126 and an internal surface of the ferrule recess 312. The ferrule recess 312 may be formed proximate to the aperture 304 and may be formed to a depth that is approximately half the depth of the bottom wall 303. One of ordinary skill in the art will readily appreciate that the plate recess 306 and the ferrule recess 312 may be formed to any depth.

As discussed above, the spring force exerted by the spring 206 onto the spring clip 208 pushes the rear end 608 of the ferrule 126. According to one example, the spring force may cause the forward end 602 of the ferrule 126 to protrude beyond the forward end of the outer housing 124. According to one example, the protruding ferrule 126 may be urged into the ferrule recess 312 and may abut the plate 106. In this way, the ferrule recess 312 provides an alignment mechanism that guides the forward end 602 of the ferrule 126 into a desired orientation relative to a plane defined by the plate 106, a plane defined by the bottom wall 303 of the connector housing 108, and/or the aperture 304. According to one example, the plane defined by the side walls of the ferrule recess 312 may be formed substantially perpendicular relative to the plane defined by the bottom wall 303 of the connector housing 108. Alternatively, the plane defined by the side walls of the ferrule recess 312 may be formed at an angle relative to the plane defined by the bottom wall 303 of the connector housing 108.

According to another example, other alignment mechanisms may be provided to secure the ferrule 126 in a desired orientation within the connector housing 108. For example, the ferrule 126 may be secured in a desired orientation relative to a plane defined by the plate 106, a plane defined by the bottom wall 303 of the connector housing 108, and/or the aperture 304. According to one example, the connector housing 108 may include pins that are received in bores provided lengthwise through the ferrule 126. Alternatively, the ferrule 126 may include pins that are received in bores provided in the connector housing 108. One of ordinary skill in the art will readily appreciate that other structures may be provided to secure the ferrule 126 in a desired orientation within the connector housing 108. Furthermore, two or more alignment mechanisms may be employed to secure the ferrule 126 in a desired orientation within the connector housing 108.

According to one example, the optical fibers 302 that are polished flush with the forward end 602 of the ferrule 126 may be provided in contact or substantial contact with the plate 106. Alternatively, the protruding ferrule 126 may be urged into the ferrule recess 312 such that the optical fibers 302 that are polished flush with the forward end 602 of the ferrule 126 are provided in near contact with the plate 106. According to one example, the ferrule recess 312 may provide an alignment mechanism that maintains the ferrule 126 in a predefined orientation relative to the aperture 304 of the connector housing 108. For example, the ferrule recess 312 may maintain the ferrule 126 in a predefined x-y-orientation, rotation orientation, and/or angular orientation, among other orientations. Furthermore, the spring force that urges the ferrule 126 into the ferrule recess 312 may provide an alignment mechanism that maintains the ferrule 126 in a predefined z-orientation and/or angular orientation, among other orientations. In this way, the ferrule recess 312 provides an alignment mechanism that guides the light rays into the spectrometer 504 at a desired angle.

According to one example, the plate recess 306 provides an alignment mechanism that places the plate 106 into a desired orientation relative to a plane defined by the bottom wall 303 of the connector housing 108 and/or the aperture 304. According to one example, the plane defined by the bottom wall of the plate recess 306 may be formed substantially parallel relative to the plane defined by the bottom wall 303 of the connector housing 108. Alternatively, the plane defined by the bottom wall of the plate recess 306 may be formed at an angle relative to the plane defined by the bottom wall 303 of the connector housing 108. In this way, the plate recess 306 provides an alignment mechanism that guides the light rays into the spectrometer 504 at a desired angle. Furthermore, a combination of characteristics of the plate recess 306 and the ferrule recess 312 provides an alignment mechanism that guides the light rays into the spectrometer 504 at a desired angle.

Figure 6:
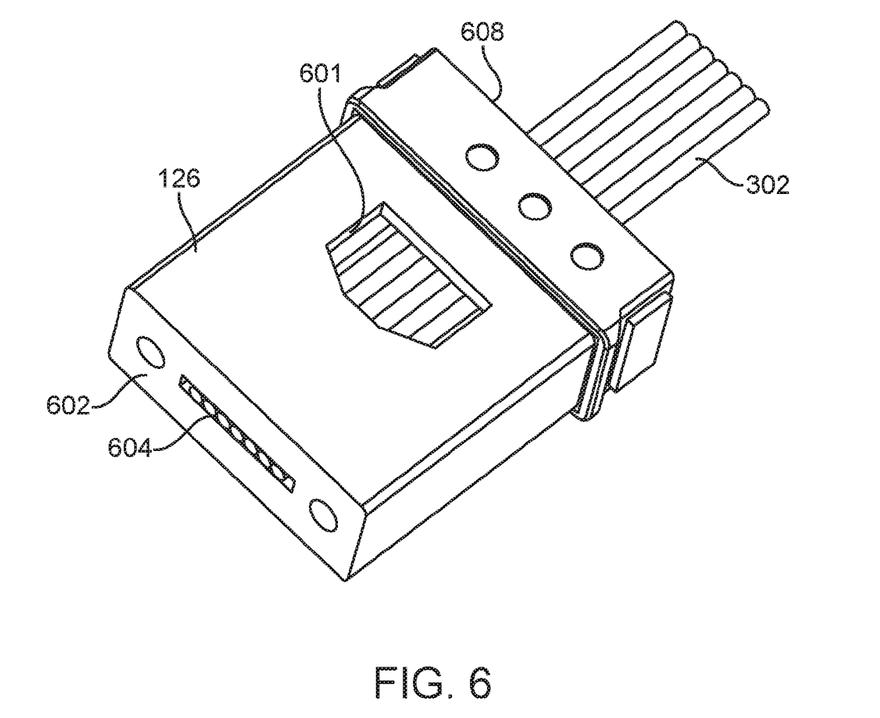
FIG. 6 illustrates a perspective view of a ferrule having optical fibers secured therein according to one example of the technology.

According to one example, the multi-fiber optical connector assembly 300 does not include any optical elements such as lenses or the like. Thus, the light rays emitted from the optical fibers 302 pass through the slit 702 in the plate 106 and into the entrance optics of the spectrometer 504 with minimal attenuation. According to one example, the optical fibers 302 may be affixed within the ferrule 126 in a side-by-side relationship to form a linear bundle or the like as shown in FIG. 6. According to one example, the optical fibers 302 may be provided in direct contact with each other within the ferrule 126. For example, the ferrule 126 may include an open interior area as shown in FIG. 4 such that the optical fibers 302 may be tightly compressed within the ferrule 126. Alternatively, the ferrule 126 may include individual guides that receive end portions of the optical fibers 302. In this case, the slot 604 in the ferrule 126 may include individual holes for each end of the optical fibers 302. According to one example, the optical fibers 302 may include silica clad silica core optical fibers, graded index optical fibers, step index optical fibers, or the like. While seven optical fibers 302 are illustrated in FIG. 6, one of ordinary skill in the art will readily appreciate that any number of optical fibers may be provided in the ferrule 126. For example, one or more optical fibers may be provided in the ferrule 126. Furthermore, one of ordinary skill in the art will readily appreciate that the optical fibers 302 may be arranged to the ferrule 126 in any configuration. For example, the optical fibers 302 may be configured in the ferrule 126 to correspond to the entrance optics of the spectrometer 504.

According to one example, the aperture 304, the plate recess 306, and the ferrule recess 312 may be formed by precision machining. For example, the precision machining may include electrical discharge machining ("EDM"), laser machining, milling, or the like. The precision machining provides the cut surfaces such as the recesses with exact tolerances and straight sidewalls.

According to one example, the multi-fiber optical connector assembly described herein may be coupled to commercially available volume phase holographic transmission grating based spectrometers such as those manufactured by Kaiser Holospec™ 1.8i (Kaiser Optical Systems, Inc., Ann Arbor, Mich.) or Wasatch Photonics (Wasatch Photonics, Logan, Utah). According to one example, the fiber optic probe assembly 502 may employ large core optical fibers such as 300 micron optical fibers. One of ordinary skill in the art will readily appreciate that the fiber optic probe assembly 502 may employ smaller core optical fibers such as 100 or 200 micron optical fibers.

According to one example, the light rays entering the spectrometer may pass through a first multi-element lens that collimates the light rays. The collimated light rays may pass through a laser blocking filter such as a long pass or notch filter. The collimated light rays may interact with a grating like a transmission grating that separate the light rays into discrete wavelengths. According to one example, the transmission grating may be a holographic transmission grating such as a Wasatch photonics Volume phase holographic transmission grating. After passing through the transmission grating, the light rays may pass through a second multi element lens that focuses the separated wavelengths of light onto a detector such as a CCD camera such as an Andor Technologies CCD camera (Andor USA, Concord Mass.). The second multi element lens may reduce the image size of the input fibers at the focal plane on the CCD detector. For example, the size reduction may reduce the light input down to approach an individual pixel width of the CCD detector.

While the technology described and illustrated herein depicts tubes, optical fibers, and the like, having circular cross-sections, it is contemplated that the tubes, optical fibers, and the like, may include any cross-sectional shape. For example, the tubes, optical fibers, and the like, may include square-shaped cross-sections, rectangular-shaped cross-sections, triangular-shaped cross-sections, or cross-sections having any other shape or combination of shapes.

Examples are described above with the aid of functional building blocks that illustrate the implementation of specified functions and relationships thereof. The boundaries of these functional building blocks have been arbitrarily defined herein for the convenience of the description. Alternate boundaries can be defined so long as the specified functions and relationships thereof are appropriately performed. While the foregoing illustrates and describes examples of this technology, it is to be understood that the technology is not limited to the constructions disclosed herein. The technology may be embodied in other specific forms without departing from its spirit. Accordingly, the appended claims are not limited by specific examples described herein.

What is claimed is:

1. A connector assembly for coupling optical fibers to a spectrometer, the connector assembly comprising:
   a plate having a slit defined therein;
   a ferrule that secures end portions of the optical fibers therein, the ferrule including a forward end having a ferrule aperture positioned to receive the optical fibers, the ferrule aperture being dimensioned to accommodate the optical fibers; and
   a connector housing having a connector aperture and an alignment mechanism, the alignment mechanism including a plate recess dimensioned to receive the plate therein and a ferrule recess dimensioned to receive the forward end of the ferrule therein, the plate recess providing an orientation to the plate and the ferrule recess providing an orientation to the ferrule.

2. The connector assembly according to claim 1, wherein the ferrule aperture is substantially rectangular-shaped with a width that is at least equal to the diameter of the optical fibers and a length that is at least equal to the diameter of the optical fibers multiplied by a number of optical fibers provided in the ferrule.

3. The connector assembly according to claim 1, wherein the plate is positioned between the connector housing and the ferrule.

4. The connector assembly according to claim 3, wherein the ferrule includes a rear end provided opposite to the forward end, the connector assembly further comprising a spring mechanism that contacts the rear end of the ferrule to impart a force that urges the forward end of the ferrule toward the plate to minimize an air gap between the plate and the ferrule.

5. The connector assembly according to claim 4, wherein the spring mechanism and the alignment mechanism maintain the ferrule in an x-y-z orientation, a rotation orientation, or an angular orientation.

6. The connector assembly according to claim 1, further comprising a locking mechanism that maintains the ferrule within the adapter.

7. The connector assembly according to claim 1, wherein the plate recess includes a bottom wall formed at an angle to orient the plate relative to the connector aperture.

8. The connector assembly according to claim 1, wherein the ferrule recess includes side walls that are formed at an angle to orient the ferrule relative to the connector aperture.

9. The connector assembly according to claim 1, wherein the ferrule recess aligns the ferrule aperture with the connector aperture to allow light rays emitted from the optical fibers to pass therethrough.

10. The connector assembly according to claim 1, wherein the optical fibers are arranged substantially parallel to each other within the ferrule.

11. The connector assembly according to claim 1, wherein the ferrule aperture includes individual openings dimensioned to accommodate ends of the optical fibers.

12. The connector assembly according to claim 1, wherein the optical fibers are in contact with each other within the ferrule.

13. A connector assembly for coupling optical fibers to a spectrometer, the connector assembly comprising:
    a plate having a slit defined therein;
    a ferrule that secures end portions of the optical fibers therein, the ferrule including a forward end having a ferrule aperture positioned to receive the optical fibers, the ferrule aperture being dimensioned to accommodate the optical fibers; and
    a connector housing having a connector aperture and an alignment mechanism, the alignment mechanism including a plate recess dimensioned to receive the plate therein and a ferrule recess dimensioned to receive the forward end of the ferrule therein, the plate recess providing an orientation to the plate, the ferrule recess providing an orientation to the ferrule, the plate and the ferrule being oriented to optically align the slit, the ferrule aperture, and the connector aperture so that light rays emitted from the optical fibers pass therethrough without passing through optical elements.

14. The connector assembly according to claim 13, wherein the ferrule aperture is substantially rectangular-shaped with a width that is at least equal to the diameter of the optical fibers and a length that is at least equal to the diameter of the optical fibers multiplied by a number of optical fibers provided in the ferrule.

15. The connector assembly according to claim 13, wherein the plate is positioned between the connector housing and the ferrule.

16. The connector assembly according to claim 15, wherein the ferrule includes a rear end provided opposite to the forward end, the connector assembly further comprising a spring mechanism that contacts the rear end of the ferrule to impart a force that urges the forward end of the ferrule toward the plate to minimize an air gap between the plate and the ferrule.

17. The connector assembly according to claim 16, wherein the spring mechanism and the alignment mechanism maintain the ferrule in an x-y-z orientation, a rotation orientation, or an angular orientation.

18. The connector assembly according to claim 13, further comprising:

an outer housing having inner sidewalls and outer sidewalls that extend between a forward end and a rear end, the inner sidewalls defining a passageway between the forward end and the rear end, the passageway being dimensioned to receive the ferrule therein; and an adapter that is mechanically coupled to the connector housing, the adapter including interior sidewalls that extend between a forward end located proximate to the connector housing and a back end, the interior sidewalls defining an adapter passageway between the forward end and the back end, the adapter passageway being dimensioned to receive the outer housing therein, the outer housing including a projection located adjacent to the forward end on one of the outer sidewalls;

the adapter including a groove located on an interior sidewall that corresponds to the outer sidewall of the outer housing having the projection, the projection being adapted to slide into the groove.

19. The connector assembly according to claim 13, further comprising a locking mechanism that maintains the ferrule within the adapter.

20. The connector assembly according to claim 13, wherein the plate recess includes a bottom wall formed at an angle to orient the plate relative to the connector aperture.

21. The connector assembly according to claim 13, wherein the ferrule recess includes side walls that are formed at an angle to orient the ferrule relative to the connector aperture.

22. The connector assembly according to claim 13, wherein the optical fibers are arranged substantially parallel to each other within the ferrule.

23. The connector assembly according to claim 13, wherein the ferrule aperture includes individual openings dimensioned to accommodate ends of the optical fibers.

24. The connector assembly according to claim 13, wherein the optical fibers are in contact with each other within the ferrule.

25. A connector assembly for coupling optical fibers to a spectrometer, the connector assembly comprising:
   a plate having a slit defined therein;
   a ferrule that secures end portions of the optical fibers therein, the ferrule including a forward end having a ferrule aperture positioned to receive the optical fibers, the ferrule aperture being dimensioned to accommodate the optical fibers, the ferrule including a rear end provided opposite to the forward end;
   a spring mechanism that contacts the rear end of the ferrule;
   a connector housing having an alignment mechanism, the alignment mechanism including a plate recess dimensioned to receive the plate therein and a ferrule recess dimensioned to receive the forward end of the ferrule therein, the plate recess providing an orientation to the plate and the ferrule recess providing an orientation to the ferrule, wherein the spring mechanism imparts a force that urges the forward end of the ferrule toward the plate to minimize an air gap between the plate and the ferrule,
   the spring mechanism and the alignment mechanism being configured to maintain the ferrule in an x-y-z orientation, a rotation orientation, or an angular orientation.

26. The connector assembly according to claim 25, wherein the optical fibers are in contact with each other within the ferrule.

27. The connector assembly according to claim 25, wherein the optical fibers are arranged substantially parallel to each other within the ferrule and wherein the ferrule aperture includes individual openings dimensioned to accommodate ends of the optical fibers.

28. The connector assembly according to claim 25, further comprising:
   an outer housing having inner sidewalls and outer sidewalls that extend between a forward end and a rear end, the inner sidewalls defining a passageway between the forward end and the rear end, the passageway being dimensioned to receive the ferrule therein; and
   an adapter that is mechanically coupled to the connector housing, the adapter including interior sidewalls that extend between a forward end located proximate to the connector housing and a back end, the interior sidewalls defining an adapter passageway between the forward end and the back end, the adapter passageway being dimensioned to receive the outer housing therein,
   the outer housing including a projection located adjacent to the forward end on one of the outer sidewalls;
   the adapter including a groove located on an interior sidewall that corresponds to the outer sidewall of the outer housing having the projection, the projection being adapted to slide into the groove.

29. A connector assembly for coupling optical fibers to a spectrometer having a slit, the connector assembly comprising:
   a ferrule that secures end portions of the optical fibers therein, the ferrule including a forward end having a ferrule aperture positioned to receive the optical fibers, the ferrule aperture being dimensioned to accommodate the optical fibers;
   a connector housing having a connector aperture and an alignment mechanism, the alignment mechanism including a ferrule recess dimensioned to receive the forward end of the ferrule therein, the ferrule recess providing an orientation to the ferrule;
   an outer housing having inner sidewalls and outer sidewalls that extend between a forward end and a rear end, the inner sidewalls defining a passageway between the forward end and the rear end, the passageway being dimensioned to receive the ferrule therein; and
   an adapter that is mechanically coupled to the connector housing, the adapter including interior sidewalls that extend between a forward end located proximate to the connector housing and a back end, the interior sidewalls defining an adapter passageway between the forward end and the back end, the adapter passageway being dimensioned to receive the outer housing therein,
   the outer housing including a projection located adjacent to the forward end on one of the outer sidewalls;
   the adapter including a groove located on an interior sidewall that corresponds to the outer sidewall of the outer housing having the projection, the projection being adapted to slide into the groove.

* * * * *